(Model.)
J. H. KNOWLES.
DRAFT EQUALIZER.
No. 261,361.  Patented July 18, 1882.
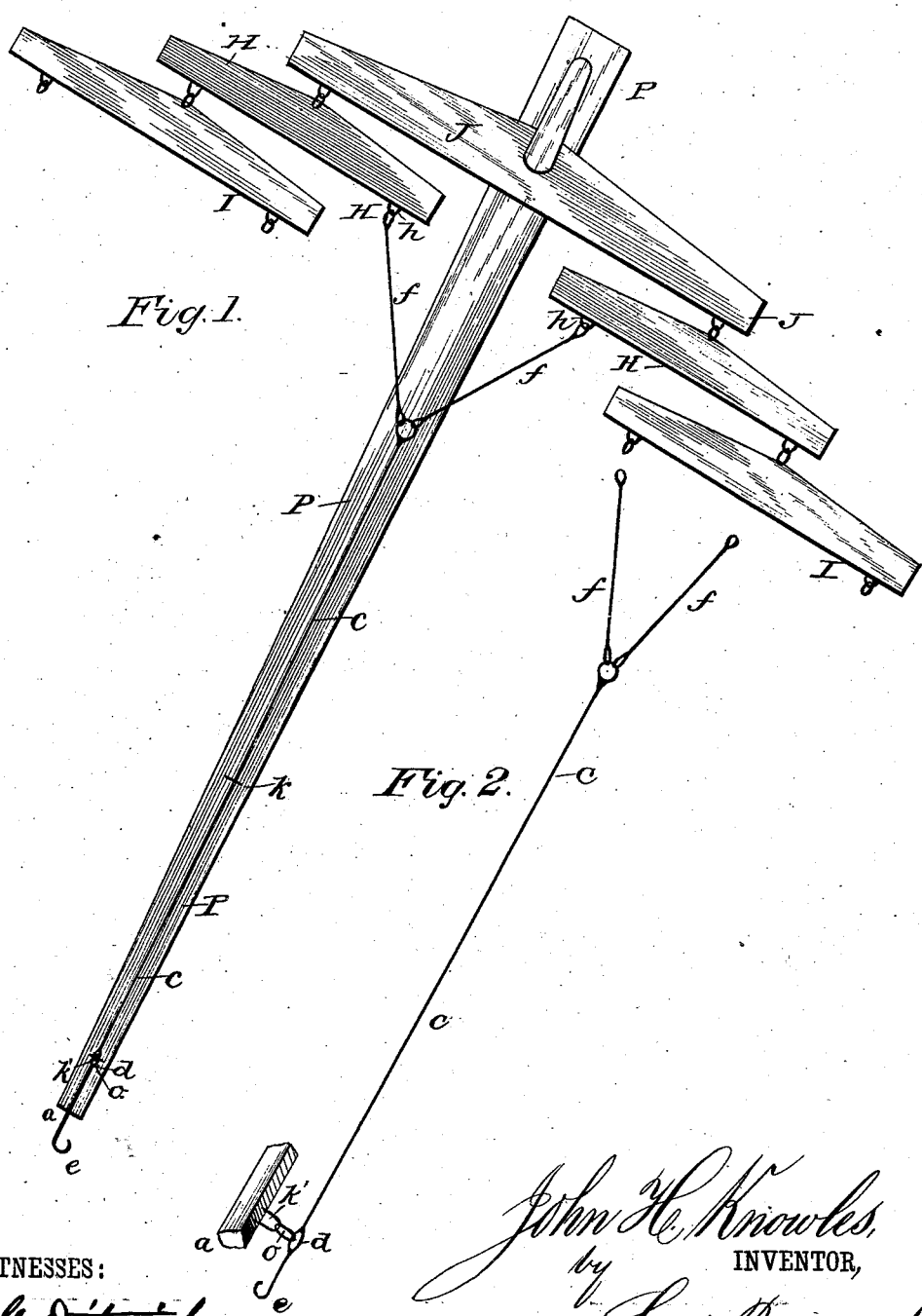

UNITED STATES PATENT OFFICE.

JOHN H. KNOWLES, OF JOHNSON, VERMONT.

DRAFT-EQUALIZER.

SPECIFICATION forming part of Letters Patent No. 261,361, dated July 18, 1882.

Application filed November 16, 1881. (Model.)

*To all whom it may concern:*

Be it known that I, JOHN H. KNOWLES, a citizen of the United States, residing at Johnson, in the county of Lamoille and State of Vermont, have invented certain new and useful Improvements in Draft-Equalizers; and I do hereby declare that the following is a full, clear, and exact description of the invention, which will enable others skilled in the art to which it appertains to make and use the same, reference being had to the accompanying drawings, which form a part of this specification, and in which—

Figure 1 is a plan of the under side of a wagon tongue or pole provided with my improved equalizer and its adjuncts, and Fig. 2 is a perspective detail view of the outer end of the pole with the evener-rods and the loop and link connecting the same to the pole.

Similar letters of reference indicate corresponding parts in all the figures.

My invention has relation to that class of draft equalizers or eveners which are adapted for the use of three or four horses, as desired, without any change in the combination and arrangement of the operative parts; and it consists in the detailed construction of the device, as hereinafter more fully described and claimed.

In the accompanying drawings, the letter P represents the pole or tongue, and J the evener. To the outer ends of the latter are hinged the levers H H, in the outer ends of each of which again are hinged the whiffletrees I I. To the inner ends of the levers H H are attached short rods $ff$, the outer ends of which are connected to the long rod $c$, which runs through one or more keepers, $k$, along the under side of the pole. At the outer end of rod $c$ is an eye, $d$, which is connected, by a loop or link, $o$, with the keeper or staple $k'$ at the outer end of the tongue. At the extreme outer end of pole $c$ is a hook, $e$, for the attachment of a single-tree or double-tree, according to whether it is desired to use three or four horses.

I am aware that eveners or draft-equalizers have been used before in which the inner ends of the whiffletrees have been connected to a rod or supplementary pole for the attachment of another whiffletree; but this construction I do not claim broadly.

What I claim as my improvement, and desire to secure by Letters Patent of the United States, is—

In a draft-equalizer consisting of the evener J, levers H H, and whiffletrees I I, the combination, with said levers and with the tongue or pole having the staple $k'$, of the rods $ff$ and sliding rod $c$, having the eye $d$, connecting loop or link $o$, and hook $e$, for the attachment of a single or double tree, as and for the purpose herein shown and specified.

JOHN H. KNOWLES.

Witnesses:
ADDIE F. TUPPER,
JACOB V. BARTON.